(12) United States Patent
Nojiri et al.

(10) Patent No.: US 6,905,590 B2
(45) Date of Patent: Jun. 14, 2005

(54) COATING COMPOSITION CONTAINING BENZOXAZINE COMPOUND

(75) Inventors: Hiroyuki Nojiri, Takatsuki (JP); Toshitaka Kawanami, Hyogo (JP); Kazuo Morichika, Takatsuki (JP); Hidenori Tanaka, Amagasaki (JP); Hiroyuki Sakamoto, Kobe (JP)

(73) Assignee: Nippon Paint Co., Ltd., Osaka (JP)

( * ) Notice: Subject to any disclaimer, the term of this patent is extended or adjusted under 35 U.S.C. 154(b) by 487 days.

(21) Appl. No.: 10/109,882

(22) Filed: Apr. 1, 2002

(65) Prior Publication Data

US 2003/0038031 A1 Feb. 27, 2003

(30) Foreign Application Priority Data

Apr. 2, 2001 (JP) ....................... 2001-103377
Apr. 2, 2001 (JP) ....................... 2001-103383

(51) Int. Cl.[7] .................... C25D 9/02; C08L 63/00
(52) U.S. Cl. ..................... 205/317; 525/529
(58) Field of Search .................. 528/87, 88, 106, 528/116, 118, 119; 525/523, 529; 523/400; 205/316, 317; 428/413, 418

(56) References Cited

U.S. PATENT DOCUMENTS

| | | |
|---|---|---|
| 4,507,428 A | 3/1985 | Higginbottom et al. |
| 4,557,979 A * | 12/1985 | Higginbottom et al. ..... 428/460 |
| 6,323,270 B1 * | 11/2001 | Ishida ......................... 524/445 |
| 6,376,080 B1 * | 4/2002 | Gallo ......................... 428/413 |
| 6,620,905 B1 * | 9/2003 | Musa ......................... 528/423 |
| 2003/0190477 A1 * | 10/2003 | Shi et al. .................... 428/413 |
| 2004/0123948 A1 * | 7/2004 | Dershem et al. ......... 156/345.1 |

FOREIGN PATENT DOCUMENTS

EP  1 063 262 A1  12/2000

OTHER PUBLICATIONS

DATABASE WPI. Section Ch. Week 200143. Derwent Publications Ltd., London, GB; AN 2001–400814, XP002216665 & JP 2001 019844 A (Asahi Kasei Kogyo KK), Jan. 23, 2001.

* cited by examiner

*Primary Examiner*—Michael J. Feely
(74) *Attorney, Agent, or Firm*—Sughrue Mion, PLLC

(57) ABSTRACT

A cationic electrodeposition coating composition containing no heavy metal-based anticorrosive agents such as lead compounds, and which is capable of forming a coating film with a high corrosion resistance. The composition contains 0.5 to 20% by weight of a compound having an N-substitued benzoxazine ring represented by formula (1), relative to a resin solid matter, and an unsaturated hydrocarbon group-containing sulfide-modified epoxy resin as a base resin:

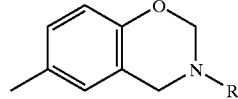

(1)

wherein R is a hydrocarbon group having 1 to 8 carbon atoms.

10 Claims, 1 Drawing Sheet

COATING COMPOSITION CONTAINING BENZOXAZINE COMPOUND

BACKGROUND OF THE INVENTION

The present invention relates to a coating composition and a production method thereof, particularly a coating composition which contains a compound having a benzoxazine ring and which forms a coating film under heating and a production method thereof, as well as a cationic electrodeposition coating composition, particularly a cationic electrodeposition coating composition which contains a compound having an N-substituted benzoxazine ring.

PRIOR ART

A coating film obtainable from a coating is desired to have a smooth surface mainly for the purpose of improving its appearance. Accordingly, various additives for improving the smoothness are available. Especially in the coating line of an electrodeposition coating, the outer panel of a body may sometimes be "overbaked", namely baked at a temperature higher than a predetermined baking temperature, resulting in a deterioration of the coating film smoothness.

On the other hand, a benzoxazine compound is known to undergo a ring-opening polymerization upon heating. Japanese Kokai Publication 2001-19844 discloses a thermosetting resin composition containing a polyphenylene ether resin and a benzoxazine compound. In this publication, the benzoxazine compound is used on the basis that it undergoes a ring-opening polymerization, and there is no description with regard to the use as an additive.

Also since a cationic electrodeposition coating enables coating to details even on a complicatedly shaped article and an automatic and continuous coating, it is used widely as an under coat on a large-sized and complicatedly shaped article which is desired to have high corrosion resistance such as an automobile. It is used widely also as an industrially applicable coating method, since it is economically beneficial due to its extremely high utilization efficiency of coating when compared with other coating methods.

A cationic electrodeposition coating used generally for an automobile and so on contains an acid-neutralizing amine-modified epoxy resin and a block isocyanate curing agent with a lead compound as an rust prevention agent. However, from the view point of an environmental protection the development of a lead compound-free cationic electrodeposition coating is accelerated recently.

As a lead compound-free cationic electrodeposition coating, a cationic electrodeposition coating composition having an epoxy resin as a skeleton and comprising a resin composition containing sulfonium and propargyl groups and unsaturated double bonds is disclosed in Japanese Kokai Publication 2000-38525. This cationic electrodeposition coating composition has a high throwing power and is capable of forming a sufficiently thick coating film even on the backside of a complicatedly shaped article whereby ensuring the corrosion resistance even on the backside.

This cationic electrodeposition coating composition exhibits a still insufficient corrosion resistance when compared with a composition containing a lead compound. Accordingly, a means for improving the corrosion resistance without using any heavy metals is desired.

SUMMARY OF THE INVENTION

An objective of the invention is to provide a novel method for improving the coating film smoothness and to provide a cationic electrodeposition coating composition containing no heavy metal-based rust prevention agents such as lead compounds and capable of forming a coating film with a high corrosion resistance.

The coating composition of the invention is a coating composition forming a coating film under heating, which comprises 0.5 to 20% by weight of a compound having an N-substituted benzoxazine ring represented by the following general formula (1) relative to a resin solid matter.

It is preferred that said compound having an N-substituted benzoxazine ring is 3,4-dihydro-3-phenyl-1,3-benzoxazine, 3,4-dihydro-3-methyl-1,3-benzoxazine, 6,6-(1-methylethylidene)bis(3,4-dihydro-3-phenyl-1,3-benzoxazine) or 6,6-(1-methylethylidene)bis(3,4-dihydro-3-methyl-1,3-benzoxazine). Said heating may be performed at 80 to 240° C.

Said coating composition may be a cationic electrodeposition coating composition.

A production method of a coating composition of the invention comprises adding, relative to a resin solid matter, 0.5 to 20% by weight of a compound having an N-substituted benzoxazine ring represented by the general formula (1) to a coating forming a coating film under heating.

The cationic electrodeposition coating composition of the invention comprises, relative to a resin solid matter, 0.5 to 20% by weight of a compound having an N-substituted benzoxazine ring represented by the general formula (1) and an unsaturated hydrocarbon group-containing sulfide-modified epoxy resin as a base resin. It is preferred that said compound having an N-substituted benzoxazine ring is 3,4-dihydro-3-phenyl-1,3-benzoxazine, 3,4-dihydro-3-methyl-1,3-benzoxazine, 6,6-(1-methylethylidene)bis(3,4-dihydro-3-phenyl-1,3-benzoxazine) or 6,6-(1-methylethylidene)bis(3,4-dihydro-3-methyl-1,3-benzoxazine).

In cationic electrodeposition coating composition of the invention, an organic acid having a hydroxyl group or amide group is used preferably as a neutralizing acid. Said unsaturated hydrocarbon group may be a propargyl group and said epoxy resin may be a novolac epoxy resin.

The cationic electrodeposition coating composition of the invention may substantially be lead-free.

Figure 1:
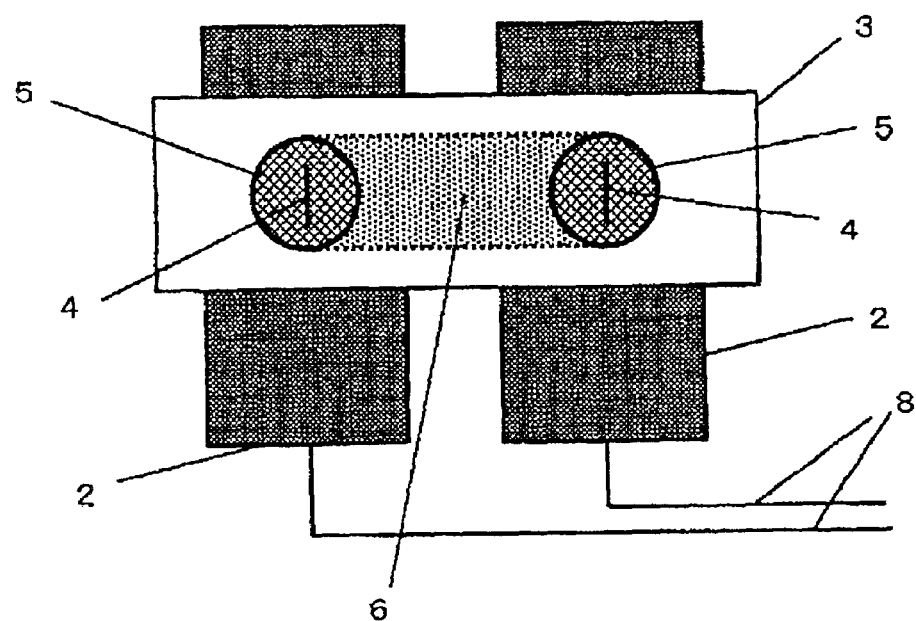
FIG. 1 is a top view of a corrosion resistance evaluation cell used for evaluating the corrosion resistance in Examples 3 to 6 and Comparative Example 2.

| EXPLANATION OF THE NUMERICAL SYMBOLS | |
|---|---|
| 1 | Corrosion resistance evaluation cell |
| 2 | Coated plate |
| 3 | Cell |
| 4 | Incision |
| 5 | O ring |
| 6 | Brine |
| 7 | Buck |
| 8 | Connecting line to the power |

DESCRIPTION OF THE PREFERRED EMBODIMENTS

A coating composition of the invention comprises a compound having an N-substituted benzoxazine ring represented by the formula (1):

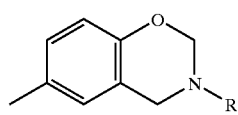

(1)

wherein R is a hydrocarbon group having 1 to 8 carbon atoms such as methyl, phenyl, cyclohexyl, vinylphenyl groups and the like. Said N-substituted benzoxazine ring is a benzoxazine ring to the nitrogen atom of which said R is bonded.

Among compounds having N-substituted benzoxazine rings, a compound having a single N-substituted benzoxazine ring includes, for example, 3,4-dihydro-3-phenyl-1,3-benzoxazine, 3,4-dihydro-3-methyl-1,3-benzoxazine, 3,4-dihydro-3-cyclohexyl-1,3-benzoxazine and the like. One having two N-substituted benzoxazine rings includes, for example, those having the structures shown below.

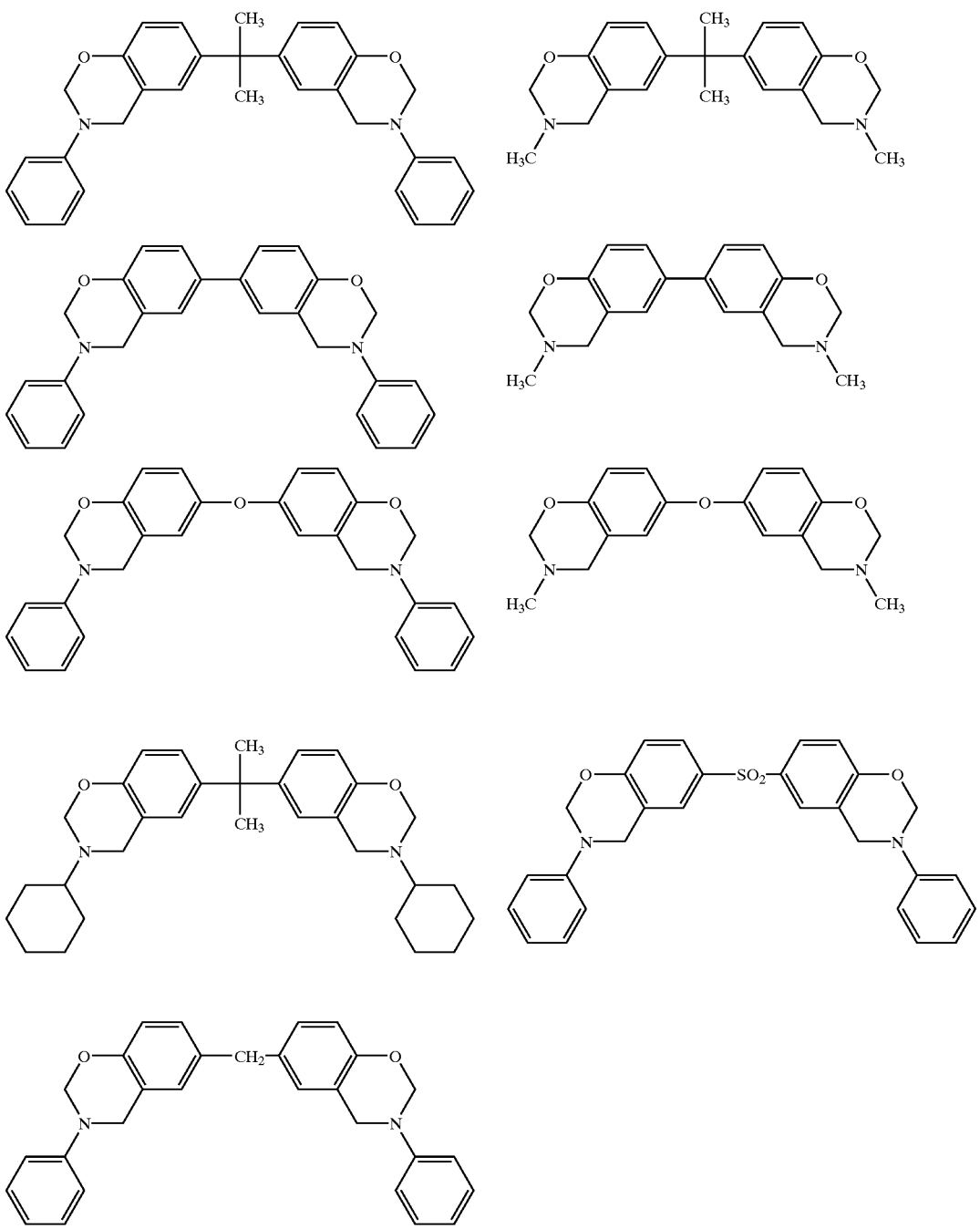

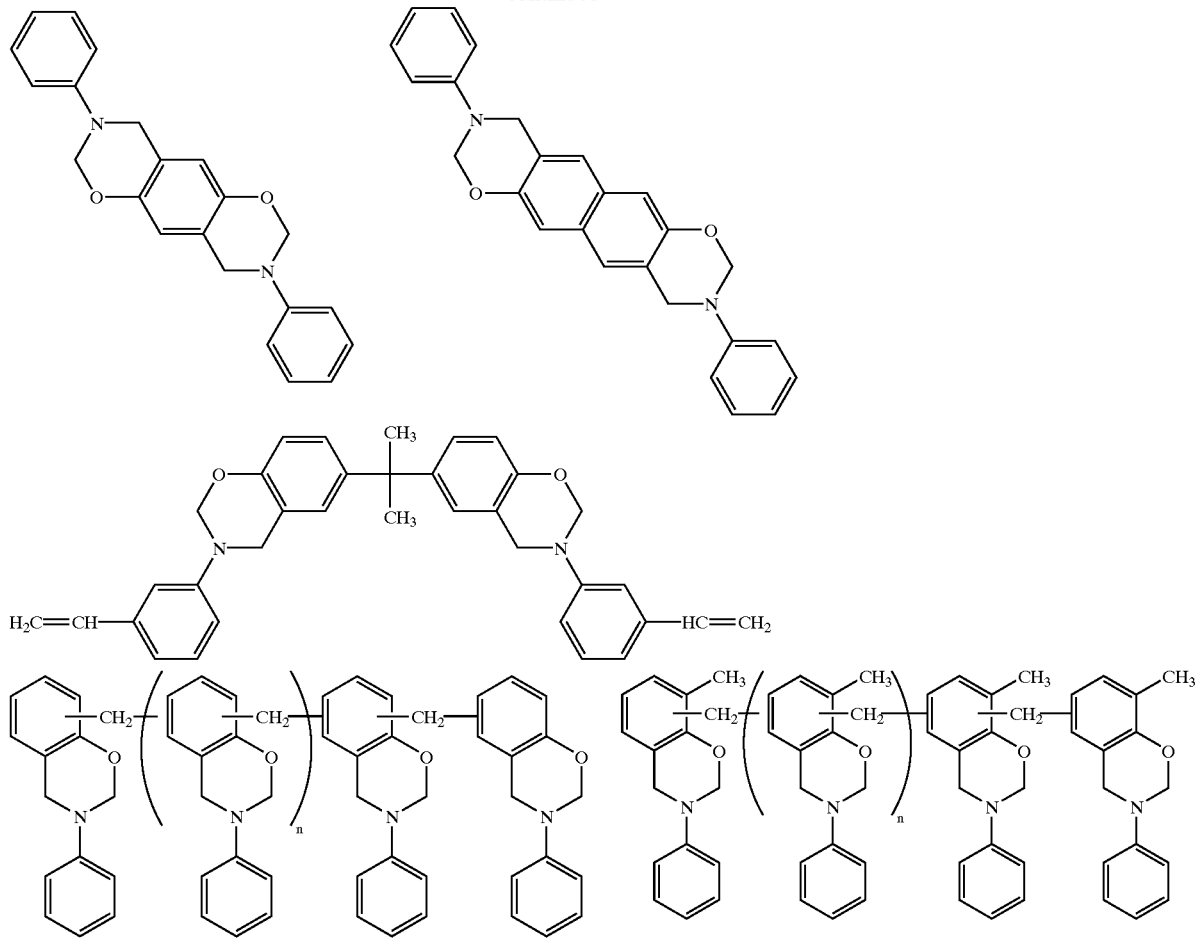

Among these, 3,4-dihydro-3-phenyl-1,3-benzoxazine or 3,4-dihydro-3-methyl-1,3-benzoxazine as a compound having a single N-substituted benzoxazine ring and 6,6-(1-methylethylidene)bis(3,4-dihydro-3-phenyl-1,3-benzoxazine) or 6,6-(1-methylethylidene)bis(3,4-dihydro-3-methyl-1,3-benzoxazine) as a compound having two N-substituted benzoxazine rings are preferred since they are readily available.

The N-substituted benzoxazine ring described above is synthesized usually using a phenol compound, formaldehyde and an amine compound having a substituent as raw materials. Accordingly, a compound having an N-substituted benzoxazine ring will have a structure based on such raw materials. While a polyfunctional phenol compound or an amine compound having a substituent may be used in order to obtain a compound having two or more N-substituted benzoxazine rings, such a polyfunctionalization may usually be accomplished using a polyfunctional phenol compound which is readily available.

The phenol compound mentioned above includes, for example, a monofunctional compound such as phenol, cresol, ethylphenol and naphthol, and a bifunctional compound such as bisphenol A, bis(hydroxyphenyl)methane, dihydroxybiphenyl, dihydroxydiphenylsulfone, dihydroxyphenylketone, hydroquinone and dihydroxynaphthalene. In addition, the phenol compound described above includes those having hydroxyphenyl moieties such as resorcyldiphenyl phosphate, for instance. In such a case, said compound having an N-substituted benzoxazine ring has a phosphate moiety in addition to the N-substituted benzoxazine ring. Among these, bisphenol A is preferred since it is readily available.

An amine compound having a substituent includes, for example, aniline, toluidine, methylamine and cyclohexylamine.

The coating composition of the invention comprises 0.5 to 20% by weight of a compound having the N-substituted benzoxazine ring described above relative to the resin solid matter. An amount less than 0.5% by weight cannot result in improving the resultant coating film smoothness, while exceeding 20% by weight will not rewarded with any additional effect. A preferable amount is 1 to 10% by weight.

A coating composition of the invention is not particularly restricted provided that it can form a coating film under heating. Thus, no significance is given to a difference in the configuration among solvent-borne, water-borne and powder coatings, in the film-forming ability between thermosetting and thermoplastic coatings, in the type of the coating constituent binder resin and the combination thereof with a curing agent, in the presence or absence of pigments between solid coatings and clear coatings or in the coating method between electrodeposition and PCM coatings. While such a heating may be determined in any way depending on the coating type and the coating method, it is performed preferably at a temperature ranging from 80 to 240° C.

A production method of a coating composition of the invention comprises adding a compound having an N-substituted benzoxazine ring represented by the above general formula (1) to a coating forming a coating film under heating. The coating to which a compound having an N-substituted benzoxazine ring is added can itself be used as a coating. Thus, the addition of the compound having an N-substituted benzoxazine ring is performed to improve the coating film smoothness obtained from the coating alone. Accordingly, this compound having an N-substituted benzoxazine ring may not necessarily be subjected to a curing. Nevertheless, it should be noticed that there is no denying that the compound having an N-substituted benzoxazine ring may undergo a ring-opening polymerization.

The amount of the above compound having an N-substituted benzoxazine ring to be added is 0.5 to 20% by weight relative to the resin solid matter of the coating. An amount less than 0.5% by weight cannot result in improving the resultant coating film smoothness, while exceeding 20% by weight will not rewarded with any additional effect. The addition may be accomplished by any method known in the art which is considered to be appropriate for the respective coating.

The production method of a coating composition of the invention provides the coating composition described above, and the descriptions of a compound having an N-substituted benzoxazine ring and others given already with regard to a coating composition are applied here as they are.

The coating composition of the invention is preferably a cationic electrodeposition coating composition which exhibits a maximum effect of the invention. Such a cationic electrodeposition coating composition includes, for example, an ordinary cationic electrodeposition coating composition having an epoxy resin as a base resin and a block isocyanate as a curing agent. Particularly, among such ordinary cationic electrodeposition coating compositions, it is preferable to add a compound having an N-substituted benzoxazine ring to a cationic electrodeposition coating composition having an oxazolidone ring as its base resin and referred to as a lead-free cationic electrodeposition coating composition.

The cationic electrodeposition coating composition of the invention comprises a compound having an N-substituted benzoxazine ring represented by the above general formula (1). As a result of the presence of this compound, a resultant coating film exhibits improved corrosion resistance and surface smoothness.

As cationic electrodeposition coating compositions of the invention, the above compound having an N-substituted benzoxazine ring includes, for example, any of those listed for a coating composition described above.

The cationic electrodeposition coating composition of the invention contains 0.5 to 20% by weight of a compound having an N-substituted benzoxazine ring described above relative to the resin solid matter. An amount less than 0.5% by weight cannot result in improving the corrosion resistance of a resultant electrodeposited coating film, while exceeding 20% by weight will not be rewarded with any additional effect. A preferable amount is 1 to 10% by weight.

It is preferable that the cationic electrodeposition coating composition of the invention may substantially be lead-free. The expression "substantially lead-free" used here means to include that lead is contained when a pigment containing lead as a trace component is used for an electrodeposition coating.

The cationic electrodeposition coating composition of the invention preferably contains an unsaturated hydrocarbon group-containing sulfide-modified epoxy resin as a base resin. The above sulfide-modified epoxy resin is obtainable by reacting a sulfide/acid mixture with an epoxy resin, which contains the epoxy resin as a skeleton and to which a sulfonium group is bonded via an opened epoxy ring.

The above starting epoxy resin includes, for example, a epibisepoxy resin which is a reaction product of a bicyclic phenol compound such as bisphenol A, bisphenol F and bisphenol S with epichlorohydrin; a derivative thereof obtained by means of a chain elongation using a diol such as bifunctional polyester polyols and polyether polyols as well as bisphenols, dicarboxylic acids and diamines; a polybutadiene epoxide; a novolac phenol polyepoxy resin; a novolac cresol polyepoxy resin; a polyglycidyl acrylate; a polyglycidyl ether of an aliphatic polyol or polyether polyol such as triethylene glycol diglycidyl ether, tetraethylene glycol diglycidyl ether and polyethylene glycol diglycidyl ether; a polyglycidyl ester of a polybasic carboxylic acid and the like. Since polyfunctionalization for the purpose of enhancing the curability can be performed, a novolac epoxy resin such novolac phenol epoxy resins and novolac cresol epoxy resins is preferred. The number average molecular weight of the above starting epoxy resin is preferably 400 to 15000, more preferably 650 to 12000.

The number average molecular weight of the above sulfide-modified epoxy resin is preferably 500 to 20000. A molecular weight less than 500 leads to a poor coating efficiency in a cationic electrodeposition process, while exceeding 20000 makes it difficult to form a good coat on the surface of an article. A more preferred number average molecular weight may vary depending on the resin skeleton, and it is 700 to 5000 for example in the cases of novolac phenol epoxy resins and novolac cresol epoxy resins.

In a cationic electrodeposition coating composition of the invention, a sulfonium group and an unsaturated hydrocarbon groups are introduced into the resin having an epoxy resin as a skeleton described above via a ring-opened epoxy group of the epoxy resin which forms said skeleton. The above unsaturated hydrocarbon group is preferably a propargyl group in view of the curability, more preferably a propargyl group in combination with an unsaturated double bond described in Japanese Kokai Publication 2000-38525. The above unsaturated double bond is a carbon-carbon double bond.

In the above unsaturated hydrocarbon group-containing sulfide-modified epoxy resin, the resin whose skeleton is an epoxy resin may contain all of the sulfonium group and the unsaturated hydrocarbon group in one molecule, but it may also be possible that a resin having only the sulfonium group in one molecule may be mixed with a resin having the both of the sulfonium group and the unsaturated hydrocarbon group. Similarly in the case where an unsaturated double bond is present in addition to the propargyl group as described above, one molecule may contain all of the three groups i.e. sulfonium, propargyl and unsaturated double bonds, but it may also be possible that either one or two of the sulfonium, propargyl and unsaturated double bonds, may be contained in one molecule.

The above sulfonium group is a hydrating functional group of the above cationic electrodeposition coating composition. It is understood that the sulfonium group loses its ionic group as a result of an electrolytic reduction on an electrode when being subjected to a voltage or current at higher than a certain level during the electrodeposition coating process, whereby being converted into a nonconductive species. As a result, the above cationic electrodeposition coating composition can produce a high throwing power.

Also during this electrodeposition coating process, an electrode reaction may be induced and a resultant hydroxide ion may be kept by a sulfonium group, whereby generating an electrolytically generated base in an electrodeposited coat. It is understood that this electrolytically generated base may serve to convert a propargyl group which is present in the electrodeposited coat and which is poorly reactive under heating into an allene bond which is highly reactive under heating.

The above sulfonium content is preferably 5 to 400 mmol per 100 g solids of the resin of the cationic electrodeposition coating composition. An amount less than 5 mmol/100 g cannot result in exhibiting a sufficient throwing power or curability and also leads to poor hydratability and bath stability. Exceeding 400 mmol/100 g leads to a poor deposition of a coat on the surface of an article. A more preferred content may vary depending on the resin skeleton, and is 5 to 250 mmol, more preferably 10 to 150 mmol per 100 g solids of the resin in the cases of novolac phenol epoxy resins and novolac cresol epoxy resins.

It is understood that the above propargyl group increases in its reactivity by being converted into an allene bond as described above, whereby constituting a curing system. A coexistence with a sulfonium group can contribute to a further improvement in the throwing power of an electrodeposition coating, although the reasons are not clear.

When a propargyl group is contained, the content is preferably 10 to 485 mmol per 100 g solids of the resin of a cationic electrodeposition coating composition. An amount less than 10 mmol/100 g cannot result in exhibiting a sufficient throwing power or curability, while exceeding 485 mmol/100 g may have an adverse effect on the hydrating stability upon use as a cationic electrodeposition coating. A more preferred content may vary depending on the resin skeleton, and is 20 to 375 mmol per 100 g solids of the resin in the cases of novolac phenol epoxy resins and novolac cresol epoxy resins.

When the above unsaturated hydrocarbon-containing sulfide-modified epoxy resin further contains an unsaturated double bond in addition to the propargyl group, such an unsaturated double bond can improve the curability due to its high reactivity.

The above unsaturated double bond content is preferably 10 to 485 mmol per 100 g solids of the resin of a cationic electrodeposition coating composition. An amount less than 10 mmol/100 g cannot result in exhibiting a sufficient curability, while exceeding 485 mmol/100 g may have an adverse effect on the hydrating stability upon use as a cationic electrodeposition coating. A more preferred amount may vary depending on the resin skeleton, and is 20 to 375 mmol per 100 g solids of the resin composition in the cases of novolac phenol epoxy resins and novolac cresol epoxy resins.

When a cationic electrodeposition coating composition further containing an unsaturated double bond is used, the unsaturated double bond content is represented by an amount corresponding to the epoxy content into which the unsaturated double bond is introduced. Thus, even in the case, for example, where a molecule having two or more unsaturated double bonds therein such as a long chain unsaturated fatty acid is introduced into an epoxy group, the unsaturated double bond content is represented by the epoxy content into which the above molecule having two or more unsaturated double bonds is introduced. This is based on the understanding that even when a molecule having two or more unsaturated double bonds is introduced into a single epoxy group, the number of the unsaturated double bonds which is concerned substantially with the curing reaction is only one.

The total content of the above sulfonium and unsaturated hydrocarbon groups is preferably less than 500 mmol per 100 g solids of the resin. Exceeding 500 mmol may make it impossible to obtain a resin actually or to achieve an intended performance. A more preferred content may vary depending on the resin skeleton, and is less than 400 mmol in the cases of novolac phenol epoxy resins and novolac cresol epoxy resins.

The total content of propargyl groups and unsaturated double bonds is preferably 80 to 450 mmol per 100 g solids of the resin. An amount less than 80 mmol may lead to an insufficient curability, while exceeding 450 mmol may lead to an insufficient throwing power due to a decrease in sulfonium group content. A more preferred content may vary depending on the resin skeleton, and is more preferably 100 to 395 mmol in the cases of novolac phenol epoxy resins and novolac cresol epoxy resins.

In the above unsaturated hydrocarbon group-containing sulfide-modified epoxy resin, a curing catalyst may be introduced, and in the case for example where such a curing catalyst can form an acetylide with a propargyl group, the curing catalyst can be introduced into the resin by converting some of the propargyl groups to the acetylides.

The above unsaturated hydrocarbon group-containing sulfide-modified epoxy resin can be produced as described below. Thus, an epoxy resin containing at least two epoxy groups in one molecule is reacted first with an unsaturated hydrocarbon group-containing compound and then any remaining epoxy group is reacted with a mixture of a sulfide and an acid whereby introducing a sulfonium group. By introducing the sulfonium group later as described above, the decomposition of the sulfonium group under heating can be prevented.

As the above unsaturated hydrocarbon group-containing compound, an unsaturated bond-containing alcohol and/or carboxylic acid can be used. The above unsaturated bond-containing alcohol is not particularly restricted but includes, for example, an unsaturated triple bond-containing alcohol such as propargyl alcohol; and an unsaturated double bond-containing alcohol such as allyl alcohol, 2-hydroxyethyl acrylate, 2-hydroxyethyl methacrylate, hydroxypropyl acrylate, hydroxypropyl methacrylate, hydroxybutyl acrylate, hydroxybutyl methacrylate and metacryl alcohol.

The above unsaturated bond-containing carboxylic acid is not particularly restricted but includes, for example, an unsaturated triple bond-containing carboxylic acid such as propargylic acid; acrylic acid, methacrylic acid, ethacrylic acid, crotonic acid, maleic acid, phthalic acid and itaconic acid; a half esters such as ethyl maleate, ethyl fumarate, ethyl itaconate, mono(meth)acryloyloxyethyl succinate and mono(meth)acryloyloxyethyl fumarate; a synthetic unsaturated fatty acid such as oleic acid, linolic acid and ricinoleic acid; a naturally occurring unsaturated fatty acid such as linseed oil and soybean oil.

When a modification is performed using a compound having an unsaturated triple bond-containing hydrocarbon group, propargyl alcohol is used preferably since it is readily available and readily reacted.

An unsaturated hydrocarbon group-containing compound and the amount thereof may vary depending on the type and the amount of the unsaturated hydrocarbon group to be introduced. The above conditions of the reaction may usually be room temperature or 80 to 140° C. for several hours. If necessary, the known component for promoting reaction such as a catalyst or solvent may also be used. The end-point of reaction can be confirmed by determining the epoxy equivalent, and the introduced functional groups can be identified by analysis of the nonvolatile fraction or instrumental analysis of the resulting resin composition. Also when a propargyl group and an unsaturated double bond are contained as unsaturated hydrocarbon groups, a propargyl group-containing compound and an unsaturated double bond-containing compound are used in the reactions and may be reacted successively in any order. They may be reacted also simultaneously.

Into the epoxy group remaining in the unsaturated hydrocarbon group-containing epoxy resin composition obtainable in the above manner, a sulfonium group is introduced. The introduction of the sulfonium group may be accomplished by a method comprising reacting a sulfide/acid mixture with an epoxy group to introduce a sulfide and to convert into a sulfonium compound or a method comprising introducing a sulfide and converting the introduced sulfide into a sulfonium using an acid or alkyl halide followed if necessary by an anion exchange. The method using sulfide/acid mixture is preferred in view of the availability of the raw material.

The above sulfide is not restricted particularly but includes, for example, an aliphatic sulfide, a mixed aliphatic-aromatic sulfide, an aralkyl sulfide, a cyclic sulfide and the like, and a substituent bonded to such a sulfide is preferably one having 2 to 8 carbon atoms. Specifically, there may be mentioned diethyl sulfide, dipropyl sulfide, dibutyl sulfide, dihexyl sulfide, diphenyl sulfide, ethylphenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propanol and the like.

As for the above acid, an organic acid is usually used such as formic acid, acetic acid, lactic acid, propionic acid, butyric acid, dimethylol propionic acid, dimethylol butanoic acid, N-acetylglycine, N-acetyl-β-alanine, sulfamic acid and the like. An acid used here is referred to as a neutralizing acid in the field of cationic electrodeposition coatings. Two or more of these acids may be used in combination. Among these, an acid having a hydroxyl group in its molecule such as dimethylol propionic acid and dimethylol butanoic acid and an acid having an amide group in its molecule such as N-acetylglycine and N-acetyl-β-alanine are used preferably since they can promote the ring-opening polymerization of a compound having an N-substituted benzoxazine ring as detailed below.

With regard to the ratio between the quantities in the above reaction, taking the epoxy group of an epoxy compound as 1 equivalent, 0.8 to 1.2 equivalent, preferably 0.9 to 1.1 equivalent of a sulfide and an acid and 1 to 20 equivalent of water are combined. With regard to the ratio between the above sulfide and acid, the acid in an amount of 0.8 to 1.2 times by mole relative to that of the sulfide is used preferably. The above reaction temperature is not restricted particularly provided that it does not promote the decomposition, and may for example be room temperature to 90° C., preferably about 75° C. The above reaction can be proceeded until confirming that the measured acid value becomes constant at 5 or less.

In the cationic electrodeposition coating composition of the invention, the use of a curing agent is not necessarily required since a base resin itself has a curability. However, a curing agent may be used for further improving the curability. As such curing agents, there may be mentioned a compound having plurality of groups of at least one kind selected from a propargyl group and an unsaturated double bond, such as a compound obtainable by an addition reaction of a propargyl group-containing compound such as propargyl alcohol or an unsaturated bond-containing compound such as acrylic acid to a polyepoxide such as novolac phenol or pentaerythritol tetraglycidyl ether.

In the cationic electrodeposition coating composition of the invention, a curing catalyst can be used for promoting the curing reaction between unsaturated bonds. Such a curing catalyst is not particularly restricted but includes, for example, one derived from bonding a ligand such as cyclopentadiene or acetylacetone or a carboxylic acid such as acetic acid or naphthenic acid to transition metal such as nickel, cobalt, copper, manganese, palladium and rhodium or a typical metal such as aluminum and zinc. Among those listed above, an acetylacetone complex of copper and cupric acetate are preferred. The amount of the above curing catalyst is preferably 0.1 to 20 mmol per 100 g solids of the resin of the cationic electrodeposition coating composition.

The cationic electrodeposition coating composition of the invention may also contain an amine. Incorporation of the amine results in increased conversion of a sulfonium to sulfide by an electrolytic reduction during an electrodeposition process. The above amine is not particularly restricted but includes amine compounds such as primary through tertiary monofunctional and polyfunctional aliphatic amines, alicyclic amines and aromatic amines, among others. Among these amines, the preferred are water-soluble or water-dispersible amines, for example, alkylamines having 1 to 8 carbon atoms such as monomethylamine, dimethylamine, trimethylamine, triethylamine, propylamine, diisopropylamine and tributylamine; monoethanolamine, dimethanolamine, methylethanolamine, dimethylethanolamine, cyclohexylamine, morpholine, N-methylmorpholine, pyridine, pyrazine, piperidine, imidazolidine, imidazole and the like. These may be used singly or two or more of them may be used in combination. Among these, the preferred are hydroxyamines such as monoethanolamine, diethanolamine and dimethylethanolamine due to its excellent aqueous dispersant stability.

The amount of the above amine to be added is preferably 0.3 to 25 meq per 100 g solids of the resin of a cationic electrodeposition coating composition. The amount less than 0.3 meq/100 g may make it impossible to obtain a sufficient effect on the throwing power, and exceeding 25 meq/100 g is uneconomical since no proportional effect to the amount of addition is obtained. More preferably, the amount is 1 to 15 meq/100 g.

The cationic electrodeposition coating composition of the invention may contain additives used commonly for a coating such as pigments and pigment dispersant resin, surfactants, antioxidants, UV absorbers and curing promoters according to need.

As pigment dispersant resin, a pigment dispersant resin containing a sulfonium group and an unsaturated bond in the resin is preferably used. Such a pigment dispersant resin containing a sulfonium group and an unsaturated bond can be obtained for example by reacting a sulfide compound with a hydrophobic epoxy resin obtainable as a result of a reaction between a bisphenol epoxy resin and a half blocked isocyanate or by reacting the above resin with a sulfide compound in the presence of a monobasic acid and a hydroxyl group-containing dibasic acid.

The cationic electrodeposition coating composition of the invention can be prepared by mixing the components described above. The cationic electrodeposition coating composition obtainable in the above manner is cationcally electrodeposited on the substrate. A cationic electrodeposition itself is accomplished in a known manner, an ordinary process comprises diluting a cationic electrodeposition coating composition with deionized water to adjust the solid content at 5 to 40% by weight, preferably 15 to 25% by weight, adjusting the bath temperature to 20° C. to 35° C. of electrodeposition bath of the resultant cationic electrodeposition coating composition and coating at a deposition voltage of 100 to 450 V. The dry film thickness of the above electrodeposited coating film is 5 to 40 μm, preferably 10 to 30 μm, the above electrodeposition coating conditions are preferably determined so as to control the film thickenss within the above range. A coating film is baked usually at a temperature of 120 to 260° C., preferably 160 to 220° C. for 10 to 30 minutes.

EFFECT OF THE INVENTION

In the coating composition of the invention and the production method thereof, it was discovered that the addition of a benzoxazine compound to a coating forming a coating film under heating is advantageous in improving the coating film smoothness.

Since the coating composition of the invention contains a compound having an N-substituted benzoxazine ring as an additive component, the resultant coating film can have an improved smoothness. A flow due to heating is understood to be contributed rather than the ring-opening polymerization of the compound having an N-substituted benzoxazine ring. In addition, the production method of a coating composition of the invention can further improve the coating film smoothness-improving effect when it is applied to a cationic electrodeposition coating composition.

Since a cationic electrodeposition coating composition of the invention contains a compound having an N-substituted benzoxazine ring, it can provide a coating film with an excellent corrosion resistance without using any heavy metal-based rust prevention agent such as a lead compound. Thus, it is understood that the N-substituted benzoxazine ring undergoes a ring-opening polymerization to generate a phenolic hydroxyl group and an amino group, which serve to an improved adhesion with a substrate. On the other hand, no such improvements can be obtained in a system employing an ordinary amine-modified epoxy resin. Since the ring-opening reaction of an N-substituted benzoxazine ring is known to be activated by an acid, the cationic electrodeposition coating composition employing a sulfide-modified epoxy resin as a base resin of the invention is considered to allow a neutralizing acid as a counter anion to be incorporated into an electrodeposited film. This understanding is supported by the fact that when a neutralizing acid having a hydroxyl group is used the corrosion resistance can further be improved. Also by employing a compound whose substituent on the nitrogen atom of an N-substituted benzoxazine ring is a methyl group, the ring-opening polymerization is enhanced and the corrosion resistance is improved.

Furthermore, the cationic electrodeposition coating composition of the invention gives a coating film exhibiting an excellent surface smoothness when compared with a composition containing no benzoxazine compound. This is understood to be resulting from the function as a flow agent before the ring-opening polymerization of the N-substituted benzoxazine ring.

EXAMPLES

Example 1

Production of Cationic Electrodeposition Coating Composition Containing Benzoxazine Compound (1)

To "POWERNIX" 110 which contains an oxazolidone ring and employs as a curing agent a block isocyanate and which is a lead-free cationic electrodeposition coating manufactured by Nippon Paint was added 5% by weight, based on the resin solid, of 3,4-dihydro-3-phenyl-1,3-benzoxazine to obtain a cationic electrodeposition coating composition containing a benzoxazine compound. The resultant cationic electrodeposition coating composition was electrodeposited on a zinc phosphate-treated steel plate at a voltage which allowed the baked film thickness to be 20 μm. The resultant coating film was baked under an ordinary condition involving 160° C. for 15 minutes and also under an overbake condition involving 220° C. for 15 minutes, whereby obtaining cured coating films.

Example 2

Production of Cationic Electrodeposition Coating Composition Containing Benzoxazine Compound (2)

A cationic electrodeposition coating composition containing a benzoxazine compound and a cured coating film were obtained in the same manner as in Example 1 except that 6,6-(1-methylethylidene)bis(3,4-dihydro-3-methyl-1,3-benzoxazine) was used instead of 3,4-dihydro-3-phenyl-1,3-benzoxazine.

Comparative Example 1

A cured coating film was obtained in the same manner as in example 1 except that *POWERNIX* 110 was electrodeposited.

(Film Smoothness Evaluation)

Each of the coating films obtained in Examples 1 and 2 and Comparative Example 1 was determined for its surface smoothness using a surface measuring instrument *SURFTEST* 211 (Product of Mitsutoyo) under the condition that the cut-off value was 0.8 mm, and the results are shown in Table 1. A value less than 0.3 μm was judged to be acceptable.

TABLE 1

| Baking conditions | Ex. 1 | Ex. 2 | Compar. Ex. 1 |
|---|---|---|---|
| 160° C. × 15 min | 0.21 μm | 0.22 μm | 0.21 μm |
| 220° C. × 25 min | 0.24 μm | 0.24 μm | 0.35 μm |

In the cationic electrodeposition coating composition containing no benzoxazine compound, the coating film smoothness was acceptable when baked ordinarily, but it became poor when overbaked. On the contrary, each of the cationic electrodeposition coating compositions containing the benzoxazine compound of Examples 1 and 2 exhibited no reduction in the coating film smoothness even when overbaked, and an effect of the addition of the benzoxazine compound was comfirmed.

Example 3

A reactor equipped with a stirrer, condenser, nitrogen inlet pipe, thermometer and dropping funnel was charged with 100.0 g of YDCN-701 whose epoxy equivalent was 200.4 (cresol novolac epoxy resin; Product of Toto Chemical), 13.5 g of propargyl alcohol and 0.2 g of dimethylbenzylamine, and the temperature was raised to 105° C. The reaction was carried out for 1 hour to give a propargyl group-containing resin whose epoxy equivalent is 445. To this was added 50.6 g of linolic acid and further 0.1 g of dimethylbenzylamine, and the reaction was carried out at the same temperature for 3 hours, whereby obtaining a resin containing a propargyl group and a long chain unsaturated hydrocarbon group whose epoxy equivalent was 2100. To this mixture were added 10.6 g of SHP-100 (1-(2-hydroxyethylthio)-2-propanol; Product of Sanyo Chemical), 4.7 g of glacial acetic acid and 7.0 g of deionized water, and the reaction carried out at a constant temperature of 75° C. for 6 hours. After the residual acid value was confirmed to be not more than 5, and then 62.9 g of deionized water, whereby obtaining the objective resin solution (% nonvolatile:69.3%, sulfonium value:23.5 mmol/100 g varnish).

To 137.1 g of the cationic electrodeposition coating base resin thus obtained which contains sulfonium, propargyl and long chain unsaturated hydrocarbon groups were added 1.0 g of nickel acetyl acetonate, 0.6 g of methyl aminoethanol and 154 g of deionized water, and the mixture was stirred using a high speed rotation mixer for 1 hour. Furthermore, 370.5 g of deionized water and 4.8 g of 3,4-dihydro-3-phenyl-1,3-benzoxazine were added to adjust the solid content at 15% by weight, whereby obtaining a cationic electrodeposition coating composition. A zinc phosphate-treated steel plate was subjected to a cationic electrodeposition using the resultant cationic electrodeposition coating composition until the dry film thickness of 20 μm had been attained, and then baked at 170° C. for 25 minutes to give an electrodeposited coating film.

Example 4

A cationic electrodeposition coating composition and an electrodeposited coating film were obtained in the same manner as in example 3 except that dimethylol propionic acid was used instead of glacial acetic acid.

Example 5

A cationic electrodeposition coating composition and an electrodeposited coating film were obtained in the same manner as in example 3 except that the same amount of 6,6-(1-methylethylidene)bis(3,4-dihyrdro-3-methyl-1,3-benzoxazine) was used instead of 3,4-dihydro-3-phenyl-1,3-benzoxazine.

Example 6

A cationic electrodeposition coating composition and an electrodeposited coating film were obtained in the same manner as in example 4 except that the same amount of 6,6-(1-methylethylidene)bis(3,4-dihydro-3-phenyl-1,3-benzoxazine) was used instead of 3,4-dihydro-3-phenyl-1,3-benzoxazine.

Comparative Example 2

A cationic electrodeposition coating composition and an electrodeposited coating film were obtained in the same manner as in example 3 except that 3,4-dihydro-3-phenyl-1,3-benzoxazine was not used.

(Smoothness Evaluation)

Each of the coating films obtained in Examples 3 to 6 and Comparative Example 2 were determined for each surface smoothness as described above for the coating film smoothness evaluation. The results are shown in Table 2.

(Corrosion Resistance Evaluation)

Figure 2:
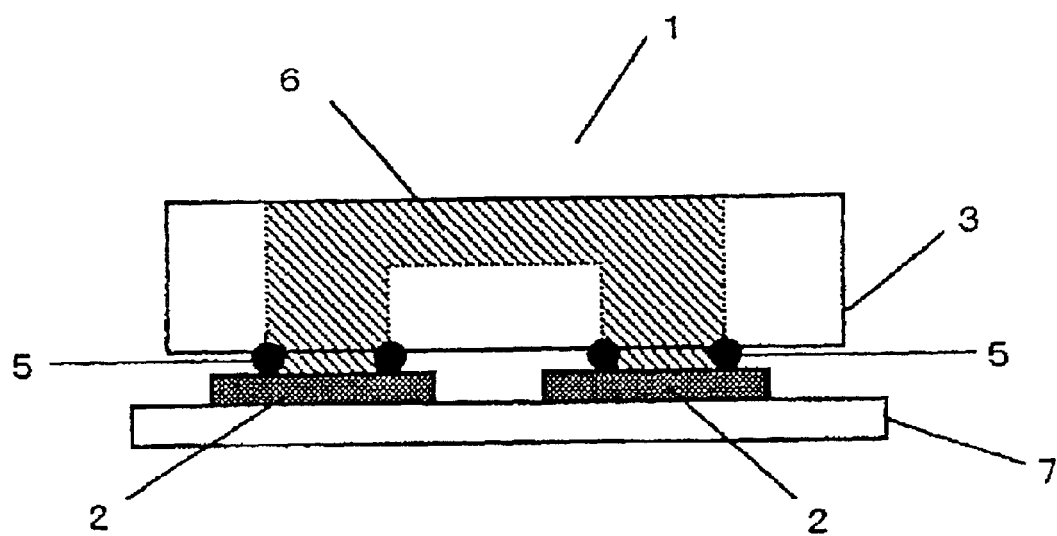
FIG. 2 is a sectional view of a corrosion resistance evaluation cell used for evaluating the corrosion resistance in Examples 3 to 6 and Comparative Example 2.

Each of the films coating films obtained in Examples 2 to 6 and Comparative Example 2 was determined for each corrosion resistance using the corrosion resistance evaluation cell described in Japanese Kokoku Publication Hei-2-51146. Specifically, two coated plates having 5 mm insicions were placed on a certain position of a corrosion resistance evaluation cell whose structure is depicted in FIGS. 1 and 2, and the cell was filled with a 5% brine and kept at 35° C. A constant current power was connected so that the two coating films served as a cathode and anode and $1 \times 10^{-4}$ A current was allowed to run continuously for 70 hours, after which the maximum tape peel width of the cathode was determined. A width of 3 mm or less was regarded to be indicative of a satisfactory corrosion resistance. The results are shown in Table 2.

TABLE 2

|  |  | Ex. 3 | Ex. 4 | Ex. 5 | Ex. 6 | Compar. Ex. 2 |
|---|---|---|---|---|---|---|
| N-substituted benzoxazine ring | Number of rings | 1 | 1 | 2 | 2 | — |
|  | Substituent | Phenyl | Phenyl | Methyl | Phenyl | — |
| Neutralizing acid |  | Acetic acid | DMPA | Acetic acid | DMPA | Acetic acid |
| Surface roughness (μm) |  | 0.18 | 0.20 | 0.17 | 0.21 | 0.4 |
| Maximum tape peel width |  | 2.9 | 1.8 | 1.9 | 1.9 | 4.3 |

DMPA represents Dimethylol propionic acid

The cationic electrodeposition coating composition of the invention exhibited excellent surface smoothness and corrosion resistance when compared with a compound containing no N-substituted benzoxazine ring-containing compound. Based on the results, the use of a methyl group as a substituent on the nitrogen atom of the N-substituted benzoxazine ring and the use of dimethylol propionic acid as a neutralizing acid were revealed to result in respective satisfactory corrosion resistances.

What is claimed is:

1. A cationic electrodeposition coating composition, which comprises, relative to a resin solid matter, 0.5 to 20% by weight of a compound having an N-subsitituted benzoxazine ring represented by the following general formula (1):

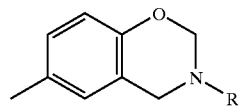

in the formula, R is a hydrocarbon group having 1 to 8 carbon atoms, and an unsaturated hydrocarbon group-containing sulfide-modified epoxy resin as a base resin.

2. The cationic electrodeposition coating composition according to claim 1, wherein said compound having an N-substituted benzoxazine ring is 3,4-dihydro-3-phenyl-1,3-benoxazine or 1,3-benzoxazine or 3,4-dihydro-3-methyl-1,3-benzoxazine.

3. The cationic electrodeposition coating composition according to claim 2, wherein an organic acid having a hydroxyl group or amide group is used as a neutralizing acid.

4. The cationic electrodeposition coating composition according to claim 2, wherein said unsaturated hydrocarbon group is a propargyl group.

5. The cationic electrodeposition coating composition according to claim 2, wherein said epoxy resin is a novolac epoxy resin.

6. The cationic electrodeposition coating composition according to claim 1, wherein said compound having an N-substituted benzoxazine ring is 6,6-(1-methylethylidene)bis(3,4-dihydro-3-phenyl-1,3-benzoxazine) or 6,6-(1-methylethylidene)bis(3,4-dihydro-3-methyl-1,3-benzoxazine).

7. The cationic electrodeposition coating composition according to claim 1, wherein an organic acid having a hydroxyl group or amide group is used as a neutralizing acid.

8. The cationic electrodeposition coating composition according to claim 1, wherein said unsaturated hydrocarbon group is a propargyl group.

9. The cationic electrodeposition coating composition according to claim 1, wherein said epoxy resin is a novolac epoxy resin.

10. The cationic electrodeposition coating composition according to claim 1, which is substantially lead-free.

* * * * *